UNITED STATES PATENT OFFICE.

THOMAS JENKINS, OF WEBSTER, NORTH CAROLINA, ASSIGNOR TO WALTER S. ADAMS, OF WAYNESVILLE, NORTH CAROLINA.

PROCESS OF TREATING NICKEL ORES, &c.

SPECIFICATION forming part of Letters Patent No. 723,159, dated March 17, 1903.

Application filed August 29, 1902. Serial No. 121,427. (No specimens.)

*To all whom it may concern:*

Be it known that I, THOMAS JENKINS, a citizen of the United States, and a resident of Webster, Jackson county, North Carolina, have invented a new and useful Process of Treating Nickel Ores and other Nickeliferous Material, of which the following is a specification.

This invention relates to a process of treating nickel ores and other nickeliferous material; and its main object is to provide a simple method of treating such material to convert the nickel present into a simple nickel salt suitable for use in the arts without further treatment or readily convertible into metallic nickel, as may be desired, the two compounds most commonly used being, as is well known, the oxid and the sulfate of nickel.

According to my present process the nickel-bearing ore is subjected to any suitable chemical treatment for obtaining the nickel compound in solution, and the nickel in solution is then precipitaed in the form of a nickel salt rich in oxygen and easily reducible to the oxid of nickel, the present invention being in the nature of a modification of that described and claimed in my companion application, Serial No. 121,426, filed August 29, 1902, in which I have set forth a process of obtaining oxid of nickel by the oxidation of the precipitated sulfid of nickel. In this case I prefer to add to the solution obtained by digesting the ore or other material with acid and lixiviating the same oxalic acid or its chemical equivalents. The reaction of these chemicals results in the precipitation of nickel oxalate, which may be readily reduced to the oxid of nickel by simply subjecting the oxalate to a reducing heat. The principal feature of this process as distinguished from that described in my companion application is the precipitation from the solution obtained from the nickeliferous ore or other material of a compound of nickel high in oxygen which may be easily reduced to the oxid.

In carrying my invention into effect I may take any suitable material, whether in the form of a matte or the natural ore—such, for example, as the silicate garnierite—first reducing the same to the proper size to enable the solvent to act thereon. When the process is applied directly to the ore, as will usually be the case, the ore should be crushed to about twenty or thirty mesh and the pulverized material mixed with a suitable solvent, which will ordinarily be concentrated sulfuric acid. After the mass has been properly digested it is thoroughly lixiviated with hot water. The acid solution is then separated from the residual ore and contains practically all the nickel content of the ore. I prefer to precipitate the nickel from this solution by adding thereto oxalic acid or its chemical equivalent and heating the ore until the nickel present is thrown down as nickel oxalate, which, as is obvious, is a nickel salt rich in oxygen. This nickel oxalate should then be separated from the liquid by filtration, after which it may be collected, washed, and heated in a suitable crucible or small furnace, a reducing heat being applied for the purpose of burning out the oxygen and carbon from the oxalate until the oxalate is reduced to nickel oxid. It will be obvious that the nickel oxid thus obtained may be converted into nickel sulfate, if desired, by dissolving it in sulfuric acid and crystallizing the nickel sulfate out in the well-known manner.

An important feature of my present process is that after the separation of the nickel oxalate from the solution of nickeliferous material or ore the oxalic acid or oxalate remaining in the solution or filtrate from which nickel oxalate has been precipitated may be recovered and returned to the original acid solution of the nickel ore for precipitating the nickel content of a fresh portion of such solution. In order to accomplish this, I prefer to add to such filtrate calcium carbonate in the form of milk of lime, which precipitates calcium oxalate from the solution. This calcium oxalate may be broken up by adding sulfuric acid thereto, when calcium sulfate will be precipitated and oxalic acid will remain in solution. This oxalic acid may be separated by decantation or filtration and afterward crystallized out and reused, the process being, therefore, a substantially continuous one.

From the above description it will be seen that the present process, like that described in my companion application before referred to, is a very simple method for treating nickel ores to obtain directly the compounds of nickel which are most used in the arts and that this process is purely chemical and involves no electrolytic action, such as is characteristic of most of the processes in commercial use for extracting nickel from its ores.

What I claim is—

1. The process of treating nickeliferous material, which consists in subjecting said material to the action of a suitable solvent, precipitating nickel from said solution as a salt of nickel easily reducible to nickel oxid, and reducing said nickel salt to nickel oxid.

2. The process of treating nickeliferous material, which consists in subjecting said material to the action of a suitable solvent, precipitating nickel from said solution as nickel oxalate, and converting said nickel oxalate into the oxid of nickel.

3. The process of treating nickeliferous material, which consists in subjecting said material to the action of a suitable solvent, precipitating nickel from said solution as nickel oxalate, and subjecting said nickel oxalate to a reducing heat to convert it into nickel oxid.

4. The process of treating nickeliferous material, which consists in subjecting said material to the action of a suitable solvent, precipitating nickel from said solution as a salt of nickel easily reducible to nickel oxid, and recovering oxalic acid from the filtrate.

5. The process of treating nickeliferous material, which consists in subjecting the material to the action of a suitable solvent, precipitating nickel from said solution as nickel oxalate, reducing said nickel oxalate to nickel oxid, precipitating an alkaline oxalate from the filtrate, and recovering oxalic acid from said alkaline oxalate.

6. The process of treating nickeliferous material, which consists in subjecting said material to the action of a suitable solvent, precipitating nickel from said solution as nickel oxalate, reducing said nickel oxalate to nickel oxid, adding calcium carbonate to the filtrate to precipitate calcium oxalate, and recovering oxalic acid from said calcium oxalate.

7. The process of treating nickeliferous material, which consists in subjecting said material to the action of a suitable solvent, precipitating nickel from said solution as nickel oxalate, reducing said nickel oxalate to nickel oxid, adding calcium hydrate to the filtrate to precipitate calcium oxalate, and adding sulfuric acid to said precipitate to recover oxalic acid.

8. The process of treating nickeliferous material, which consists in subjecting said material to the action of a concentrated acid, lixiviating the mass with hot water, precipitating nickel from the solution as nickel oxalate, and converting said nickel oxalate into the oxid of nickel.

9. The process of continuously obtaining nickel oxalate from nickeliferous material, which consists in subjecting said material to the action of a concentrated acid, lixiviating the mass with hot water, subjecting the solution to the action of oxalic acid or an oxalate and precipitating nickel oxalate, precipitating an alkaline oxalate from the filtrate, recovering oxalic acid from said alkaline oxalate, and returning the recovered oxalic acid to the original acid solution.

THOMAS JENKINS.

Witnesses:
J. W. ADAMS,
H. C. McKEE.